United States Patent
Halsey et al.

(10) Patent No.: US 10,569,904 B2
(45) Date of Patent: Feb. 25, 2020

(54) TAXI VEHICLE FOR MOVING AN AIRCRAFT

(71) Applicant: GE Aviation Systems Limted, Cheltenham, Gloucestershire (GB)

(72) Inventors: Colin John Halsey, Cheltenham (GB); Michael David Bailey, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 97 days.

(21) Appl. No.: 15/805,419

(22) Filed: Nov. 7, 2017

(65) Prior Publication Data
US 2018/0134413 A1 May 17, 2018

(30) Foreign Application Priority Data
Nov. 16, 2016 (GB) .................................. 1619402.9

(51) Int. Cl.
*B64F 1/22* (2006.01)
*B64F 1/36* (2017.01)

(52) U.S. Cl.
CPC .............. *B64F 1/225* (2013.01); *B64F 1/364* (2013.01); *B64D 2221/00* (2013.01); *Y02T 50/826* (2013.01)

(58) Field of Classification Search
CPC .......... B64F 1/225; B64F 1/227; B64F 1/228; B64F 1/364; Y02T 50/826
See application file for complete search history.

(56) References Cited

U.S. PATENT DOCUMENTS

| | | |
|---|---|---|
| 6,600,992 B2 | 7/2003 | Dow |
| 7,075,458 B2 | 7/2006 | Dowdy |
| 7,975,959 B2 * | 7/2011 | Perry .................... B64C 39/024 244/50 |
| 8,245,980 B2 * | 8/2012 | Perry ........................ B64F 1/22 244/189 |

(Continued)

FOREIGN PATENT DOCUMENTS

| | | |
|---|---|---|
| GB | 2516705 A | 2/2015 |
| WO | 2011/066891 A1 | 6/2011 |

OTHER PUBLICATIONS

Halsey, C. J., et al., Auxiliary Power Unit With Solid Oxide Fuel Cell for an Aircraft, GE Co-Pending Application No. 1619403.7, filed on Nov. 16, 2016.

(Continued)

*Primary Examiner* — Tony H Winner
*Assistant Examiner* — Michael R Stabley
(74) *Attorney, Agent, or Firm* — McGarry Bair PC

(57) ABSTRACT

In one aspect, there is disclosed a taxi vehicle comprising a chassis having a coupler to connect to a coupling location of a craft and a set of wheels with at least one electric motor coupled to the set of wheels. The taxi vehicle can include a fuel cell coupled to the at least one electric motor and a battery coupled to the fuel cell. The battery can be configured to supply peak power demand to the at least one electric motor to start moving the craft. The battery can receive charging from the fuel cell when not supplying peak power demand while the fuel cell supplies power to the at least one electric motor to continue moving the craft.

19 Claims, 5 Drawing Sheets

(56) References Cited

U.S. PATENT DOCUMENTS

| | | | |
|---|---|---|---|
| 9,090,358 B2* | 7/2015 | Perry | B64F 1/227 244/50 |
| 9,199,745 B2* | 12/2015 | Braier | B64F 1/22 244/50 |
| 2007/0090808 A1 | 4/2007 | McCabe et al. | |
| 2011/0233331 A1 | 9/2011 | Frings et al. | |
| 2012/0045906 A1 | 2/2012 | Thomas | |
| 2014/0061374 A1 | 3/2014 | Cox et al. | |
| 2015/0274323 A1 | 10/2015 | Loignon et al. | |
| 2016/0016659 A1 | 1/2016 | Cox et al. | |
| 2016/0159497 A1 | 6/2016 | Zhou et al. | |
| 2016/0163208 A1 | 6/2016 | Zhou et al. | |
| 2016/0163209 A1 | 6/2016 | Zhou et al. | |
| 2017/0029136 A1 | 2/2017 | Gendre et al. | |

OTHER PUBLICATIONS

Halsey, C. J.., et al., Powere Source for an Aircraft, GE Co-Pending Application No. 1619403.7, filed on Nov. 16, 2016.
Combined Search and Examination Report issued in connection with corresponding GB Application No. GB1619402.9 dated May 5, 2017.

* cited by examiner

TAXI VEHICLE FOR MOVING AN AIRCRAFT

BACKGROUND OF THE INVENTION

One or more main engines of an aircraft, or a diesel tug, can be used to move the aircraft between an airport terminal (or stand) and a holding area near a runway. However, the noise and pollution (particularly $NO_x$ and CO) generated by pushback and taxi movements are of increasing concern to communities near the airport. Additionally, on-ground fuel consumption is of growing concern to airline companies concerned with fuel costs. For example, taxiing aircraft can contribute up to 54% of the total airport $NO_x$ emissions and 25% of the total airport CO emissions.

One solution to the above problems is the use of electric tugs motivated by a set of batteries and allowing the aircraft engines to remain off until the aircraft has been towed to a pre-flight position. Unfortunately, it can be necessary to operate an auxiliary power unit (APU) in the tail of the aircraft to generate electricity and pneumatic power for environmental control systems (ECS) such as air conditioning, contributing substantially to pollution and noise at the airport. Also, the batteries of the electric tug can lack the reserve power necessary to displace the APU, and can require charging several times per day.

BRIEF DESCRIPTION OF THE INVENTION

In one aspect, there is disclosed a taxi vehicle for moving a craft comprising a chassis having a coupler to connect to a coupling location of the craft. The chassis can include a set of wheels with at least one electric motor coupled to the set of wheels and can include a fuel cell coupled to the at least one electric motor to energize the at least one electric motor. A battery can be coupled to the fuel cell and to the at least one electric motor and can be configured to supply peak power demand to the at least one electric motor to start moving the aircraft or to start the fuel cell. The battery can receive charging from the fuel cell when not supplying peak power demand while the fuel cell supplies power to the at least one electric motor to continue moving the aircraft.

In another aspect, there is disclosed a method of moving and starting a craft and which can comprise engaging a coupling location of the craft with a coupler of a taxi vehicle powered by a fuel cell. The taxi vehicle can include a battery coupled to at least one electric motor to move the taxi vehicle. The method can further comprise connecting electrical power from the fuel cell to the craft and coupling a pneumatic supply from the taxi vehicle to the craft while engaging the coupling location. The method can further include driving the taxi vehicle to a starting point for the craft and starting the craft using the electrical power and the pneumatic supply from the taxi vehicle.

In yet another aspect, there is disclosed a method of moving an aircraft which can comprise engaging a nose wheel of the aircraft with a coupler of a taxi vehicle powered by a fuel cell. The method can further include coupling a battery to at least one electric motor to move the taxi vehicle from a first location. The method can further include connecting electrical power from the fuel cell to the aircraft and coupling a pneumatic supply from the taxi vehicle to the aircraft while engaging the nose wheel. The method can further include driving the taxi vehicle to a second location and attaching a ground power supply to the aircraft. The method can further include disengaging the nose wheel of the aircraft from the coupler and disconnecting the electrical power and the pneumatic supply from the aircraft after the ground power supply is attached.

DETAILED DESCRIPTION OF THE INVENTION

Figure 1:
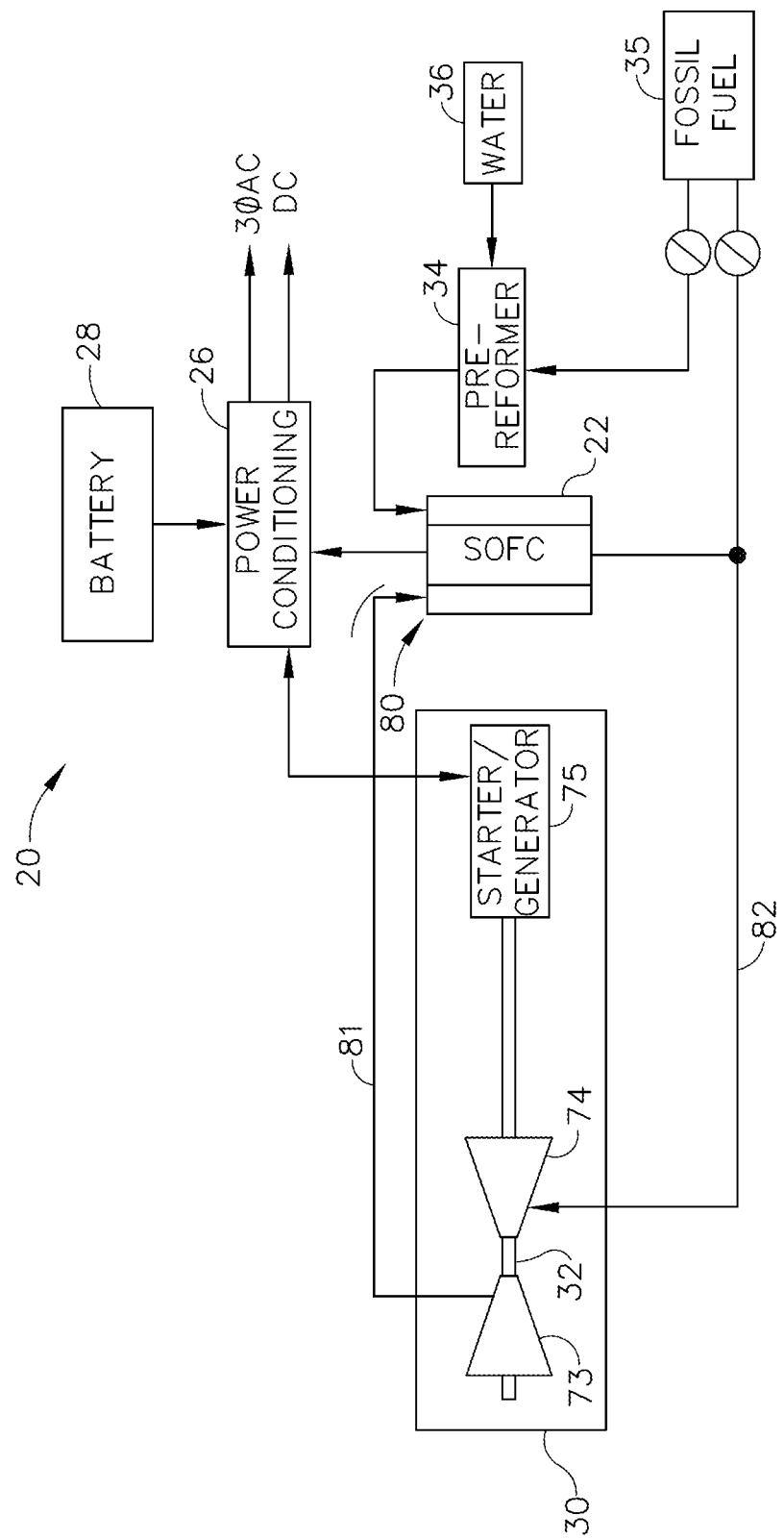
FIG. 1 illustrates a schematic of a hybrid fuel cell engine, in accordance with various aspects described herein.

FIG. 1 depicts a hybrid fuel cell engine 20 comprising a fuel cell 22 and a gas turbine engine 30 for use as an auxiliary power unit (APU) in an aircraft, ground transportation, rail locomotion, or in marine applications. The hybrid fuel cell engine 20 can utilize a solid oxide fuel cell (SOFC) or a molten carbonate fuel cell (MCFC) to generate AC (alternating current) and DC (direct current) electricity through conditioning circuit 26. A high operating temperature of the fuel cell 22, for example, 800-1000° C., can enable the use of light hydrocarbon fuels directly such as methane, methanol or natural gas. With a small additional pre-reformer 34 the fuel cell 22 can use a heavy hydrocarbon fuel 35 such as JP-8 aviation fuel. Hot exhaust gas and unburned fuel 82 from the fuel cell 22 can be utilized to power the gas turbine 30. A compressor section 73 driven by a drive shaft 32 of gas turbine 30 can in turn supply bleed air 81 to pressurize an air input 80 for the fuel cell 22. The feeding back of both unburned fuel 82 and exhaust bleed air 81 can boost the efficiency of the hybrid fuel cell engine 20.

The pre-reformer 34 is coupled to a water supply 36 to enable the conditioning process, the supply of which can be partially sustained by water generated as a by-product of the fuel cell operation. The gas turbine 30 can include the compressor section 73 and a turbine section 74 driving the drive shaft 32. A starter/generator 75 can be used to start the turbine 30 and then generate electricity from the drive shaft 32 to be combined in the power conditioning circuit 26. A battery 28 can be used to operate the starter of starter/generator 75 and/or to preheat the fuel cell 22.

In summary, combining a high temperature fuel cell 22 with a gas turbine engine 30 provides a source of electrical and pneumatic power adaptable to varying load conditions and having a fuel efficiency significantly higher than either component alone. Additional details of hybrid fuel-cell gas-turbine engines are available to those skilled in the art and will not be described further here.

As may be appreciated, there exists a need in the art for a method of aircraft pushback and taxi that produces fewer hydrocarbon pollutants and less noise. Additionally, there exists a need in the art for displacing the use of the APU and aircraft engines during on-ground operations of the aircraft. Also, there exists a need in the art for an aircraft tug that can remain active indefinitely.

Figure 2:
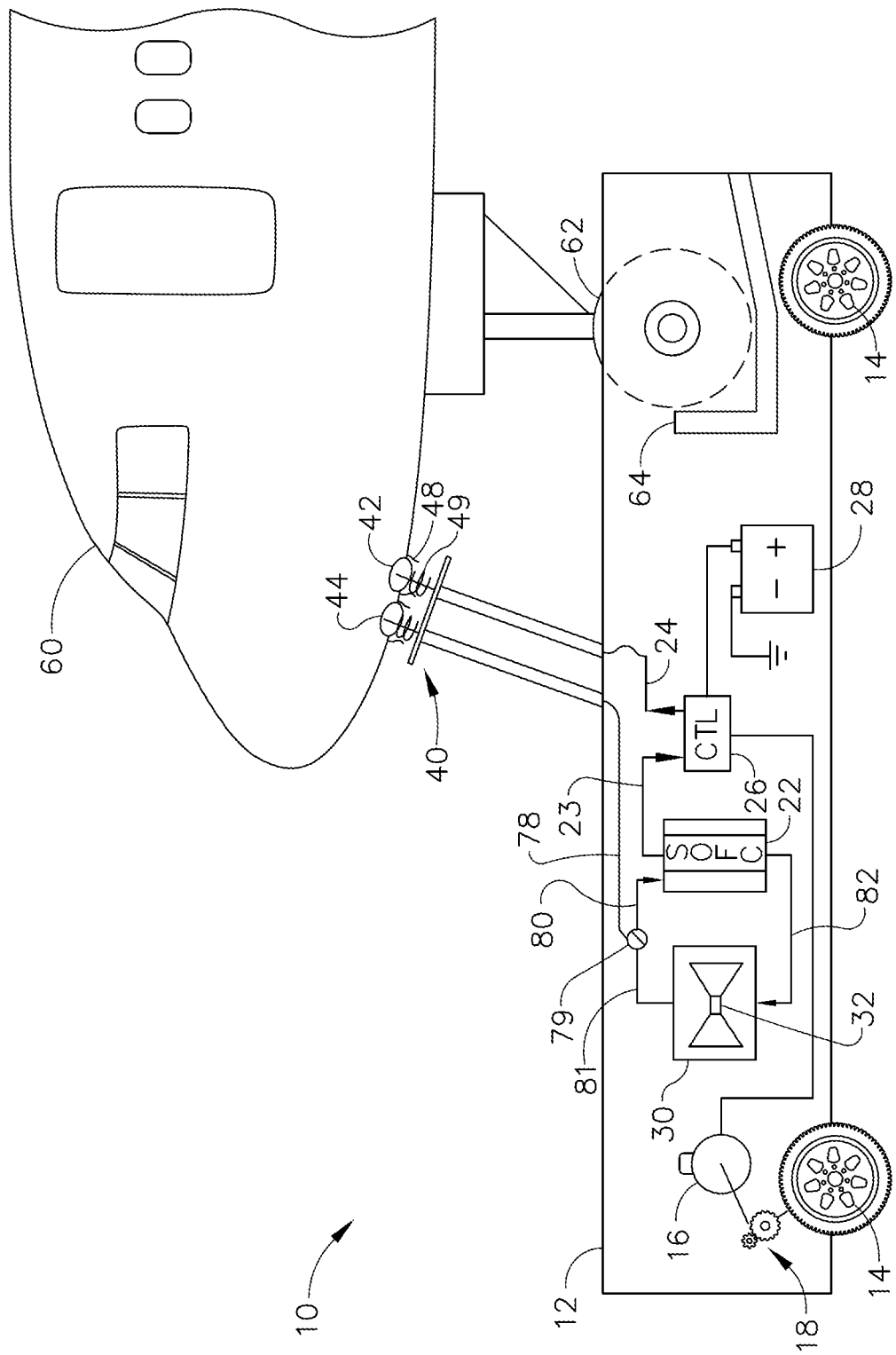
FIG. 2 illustrates a schematic of a taxi vehicle for moving an aircraft, in accordance with various aspects described herein.

Referring now to FIG. 2, in various aspects of the present disclosure, a taxi vehicle 10 for moving an aircraft 60 can comprise a chassis 12 having a coupler 64 to connect to a coupling location of the aircraft 60, such as the nose wheel 62 of the aircraft 60. The chassis 12 can be supported with wheels 14 for rolling the chassis 12, where at least one electric motor 16 is coupled to one or more of wheels 14 through a gearbox 18 for motivating the chassis 12 and thereby moving the aircraft 60. The coupler can connect to the nose wheel 62, an axle of the nose wheel, or to any supporting structure of the nose wheel or nearby portion of the aircraft 60 such that the connecting facilitates towing and steering of the aircraft 60 during pushback and towing operations of the taxi vehicle 10.

It should be understood that while the taxi vehicle 10 described herein is by way of a non-limiting example in the context of a commercial aircraft, the taxi vehicle 10 can apply to military aircraft, small private aircraft, ground-based heavy vehicles such as a bus or a truck, railroad locomotives, and marine craft. Also, other wheels of the aircraft 60 can be connected to or supported by devices (not shown) cooperating with the taxi vehicle 10 steering the aircraft 60, such as a dolly or another taxi vehicle. Alternatively, portions of ground or marine craft not supported by the coupling location of the ground or marine craft can be connected to or supported by devices (not shown) cooperating with the taxi vehicle 10.

A location of the coupler 64 relative to the wheel span of the chassis 12 can be chosen to distribute a weight of the nose wheel for suitable traction of wheels 14 and stable maneuvering of the chassis 12. Alternately, the coupler 64 can include a trailer (not shown) for supporting the nose wheel with a tow bar between the chassis 12 and the trailer.

Continuing with FIG. 2, the taxi vehicle can include a fuel cell 22 in the chassis 12 where its electrical output 23 can be coupled to the at least one electric motor 16 through a conditioning circuit 26 and can thereby move the aircraft 60. The fuel cell 22 can be a high temperature fuel cell such as a solid oxide fuel cell (SOFC). A battery 28 can be coupled to the fuel cell 22 through the conditioning circuit 26 and the one or more electric motors 16 for supplying peak power demand to the electric motor 16. Peak power can be demanded when an inertia of the aircraft 60 requires greater power to accelerate the aircraft 60 than the instantaneous power available from fuel cell 22. Beneficially, the output capacity of the fuel cell 22 can be thereby minimized to limit cost and fuel consumption to an instantaneous power rating just sufficient to sustain the pushback or taxi operation.

The battery 28 can be a high voltage battery for storing substantially more energy than a conventional aircraft battery. For example, a conventional aircraft battery can have an operating voltage of 28V and a high voltage battery can have an operating voltage of 270V or higher. The difference between the power requirements of the taxi vehicle 10 when accelerating the aircraft 60 and when taxiing the aircraft 60 at a steady speed can be supplemented by the battery 28 according to the peak power demand of the battery 28.

Additionally, the battery 28 can also be utilized to start the fuel cell 22, for example, to heat up the fuel cell 22 from a cold start or to preheat the pre-reformer (not shown) associated with the fuel cell 22. Battery 28 can also receive charging through conditioning circuit 26 when not supplying peak power to the taxi vehicle 10.

The fuel cell 22 can be a solid oxide fuel cell (SOFC) or a molten carbonate fuel cell (MCFC), or any high temperature fuel cell that can directly utilize a light hydrocarbon such as methane, methanol or natural gas. For example, the fuel cell can operate most efficiently at temperatures of 800-1000° C. The fuel cell 22 can include a gas turbine engine 30 comprising the usual compressor and combustion sections connected to a drive shaft 32. A bleed air 81 bled off the gas turbine 30 can supply an air input 80 of the fuel cell 22 and a pneumatic power 78 to the aircraft 60 via a pneumatic valve 79. Alternately, a compressor (not shown) separate from the gas turbine 30 compressor can be driven by the gas turbine 30 to provide the bleed air 81.

Continuing still with FIG. 2, exhaust gasses and unburned fuel 82 from the fuel cell 22 can be directed to the gas turbine 30 for combustion and the generation of pneumatic and electrical power. Hydrocarbon fuel (not shown) together with the unburned fuel and exhaust gasses 82 supplied to the gas turbine 30 can be utilized to turn the drive shaft 32. A starter/generator (FIG. 1) connected to drive shaft 32 can start the gas turbine 30 from battery 28 and which can then generate electrical power to be combined with the electrical output 23 of fuel cell 22 in conditioning circuit 26. Beneficially, both gas turbine 30 and fuel cell 22 are high-temperature devices that can utilize a common hydrocarbon fuel and each other's waste products to generate power with lower fuel use and pollution.

The taxi vehicle can include a power connector 40 to provide electrical power 24 to an electrical input 42 of the aircraft 60 during on-ground parking and taxi operations. Electrical input 42 can be used to power aircraft electrical systems such as lighting, communications, and avionics systems of aircraft 60. The power connector 40 can also provide a pneumatic power (compressed air) 78 from the pneumatic valve 79 and to a pneumatic input 44 of the aircraft. For example, environmental control systems (ECS) such as air conditioning can be supplied by taxi vehicle 10 through the pneumatic input 44 while standing at an airport terminal, during pushback, or during taxi movement of the aircraft 60.

Lift seal 48 can provide gas sealing for the pneumatic input 44 and environmental sealing for the electrical input 42 when the power connector 40 is pressed against the aircraft 60. In various aspects, power connector 40 can include hydraulic or electrical actuators (not shown) to align the power connector 40 with the electrical 42 and pneumatic 44 inputs of the aircraft 60. The power connector 40 can be configured to coordinate with the coupler 64 to connect to inputs 42 and 44 when the coupler engages nose wheel 62.

In aspects not shown, gearbox 18 can be a transmission, or can couple the drive shaft 32 of the gas turbine 30 to one or more wheels 14. The taxi vehicle can utilize a combination of mechanical drive from gas turbine 30 and electrical drive from conditioning circuit 26. Also, the taxi vehicle can be unmanned and remotely controlled by a pilot of the aircraft 60 through a suitable remote control system (not shown) integrated into the taxi vehicle 10 and the aircraft 60. Beneficially, the use of a fuel cell engine such as fuel cell 22 combined with gas turbine 30 can displace the use of aircraft engines and the APU by providing towing (taxi) functions and on-board electrical and pneumatic power to the aircraft 60, substantially reducing noise, pollution, and fuel use. For example, use of the taxi vehicle 10 for pushback and taxi operations could substantially reduce $NO_x$ emissions by aircraft at the airport.

Figure 3:
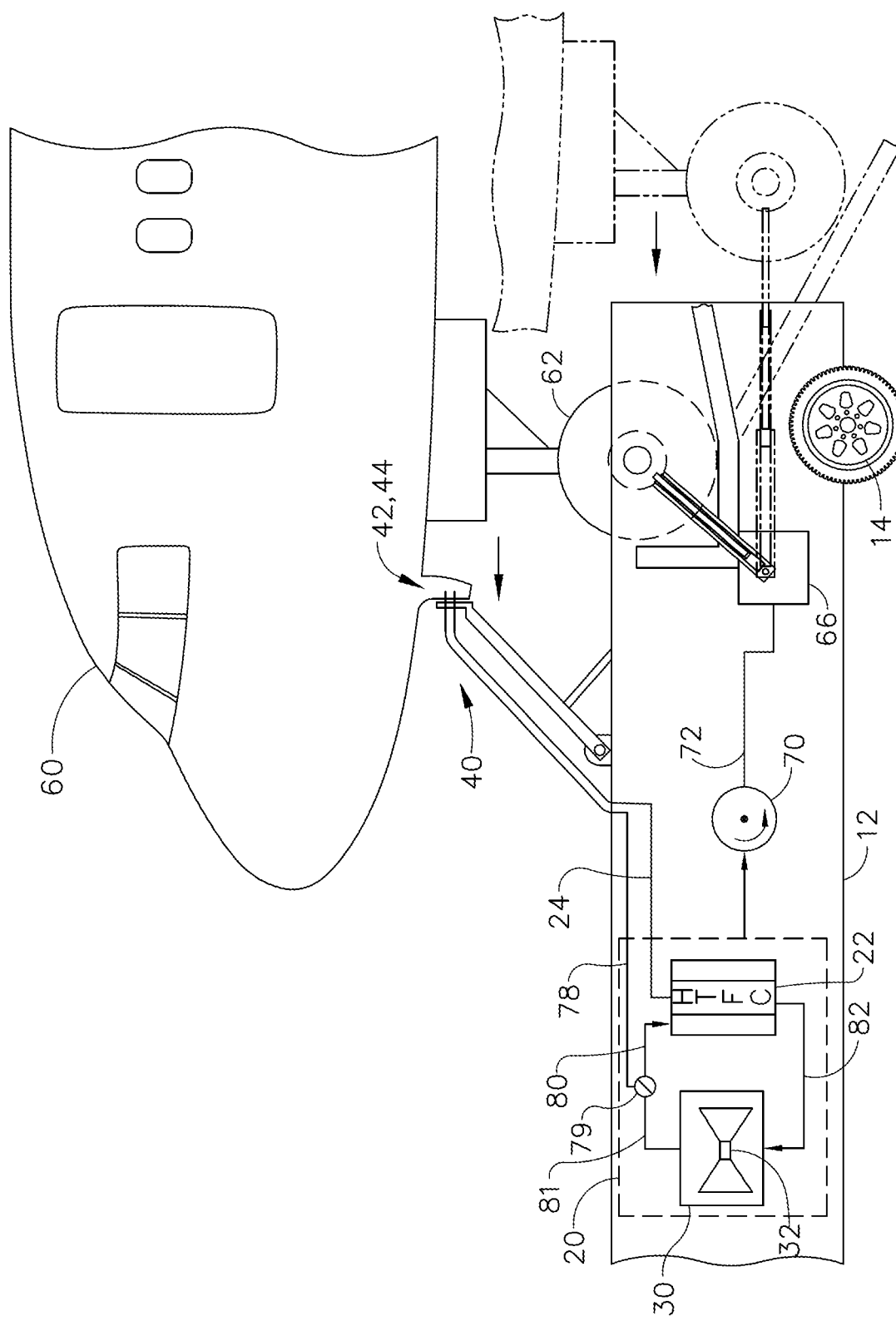
FIG. 3 illustrates a schematic of a lift mechanism for the taxi vehicle of FIG. 2, in accordance with various aspects described herein.

Referring now to FIG. 3, in various aspects of the present disclosure, the fuel cell 22 and gas turbine 30 can comprise a hybrid fuel cell engine 20 supplying electrical power 24 and pneumatic power 78 to aircraft 60 through power connector 40. The taxi vehicle 10 can include a hydraulic pump 70 driven by the hybrid fuel cell engine 20. The hydraulic pump 70 can be driven by the shaft 32 of gas turbine 30 or by the electrical power 24 of fuel cell 22.

In an aspect of the disclosure, the coupler 64 can be a lift mechanism 66 to engage and lift the nose wheel 62. The lift mechanism can include a hydraulic supply 72 connected to the hydraulic pump 70 for lifting or positioning the nose wheel 62. In the illustrated example, the lift mechanism 66 can include an arm for connecting to the nose wheel 62 and pulling it into a platform or into a basket. In alternate aspects not shown, lift mechanism 66 can scoop the nose wheel 62 into a carriage, or can suspend the nose wheel 62 above the ground in a towing configuration.

In various aspects, the power connector 40 can be part of the lift mechanism 66 to automatically connect to the aircraft as the lift mechanism 66 engages and lifts the nose wheel 62. In the illustrated example, a pulling back of nose wheel 62 into engagement with the taxi vehicle 10 can simultaneously press the power connector 40 horizontally against aircraft inputs 42 and 44 to seal the electrical and pneumatic inputs, respectively. Conversely, the lift mechanism 66 and power connector 40 can be configured to decouple from the aircraft 60 simultaneously with the disengaging of the nose wheel 62 from the taxi vehicle 10.

Alternatively, the power connector 40 and lift mechanism 66 can be designed such that a weight of the aircraft 60 is deposited vertically onto the taxi vehicle 10 when the nose wheel is engaged in order to seal the pneumatic 44 and electrical 42 inputs. Mating springs 49 (FIG. 2) can regulate pressure applied to the pneumatic 44 and electrical 42 inputs for a correct seal. Lift mechanism 66 can also employ electric or pneumatic actuators (not shown) to lift and engage the nose wheel 62. A cone or other alignment device (not shown) can be included in power connector 40 to automatically align power connector 40 with the inputs 42 and 44 of the aircraft, similar to the alignment devices used for aerial refueling and spacecraft docking.

In general applications of the taxi vehicle to air, ground or marine craft (not shown), the power connector can be part of the coupler such that one coordinated action can connect the coupler to the coupling location while the power connector connects electrical power to the craft. The connection of the coupler and power connector can have a mechanically linked connecting action such that the timing of the two actions are consistently controlled if not simultaneous. For example, connecting movements of the coupler and the power connector can substantially overlap in timing.

Figure 4:
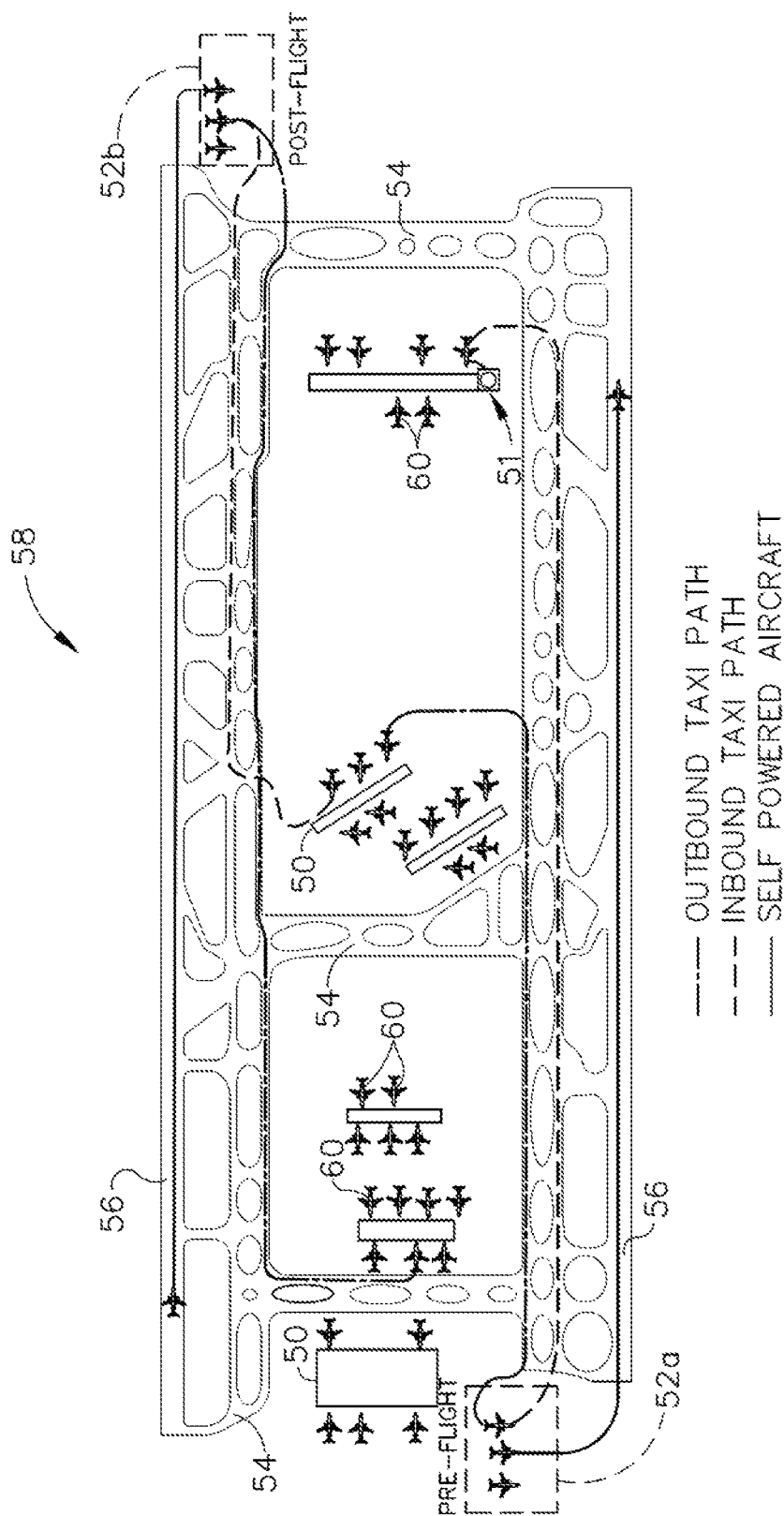
FIG. 4 illustrates a map of an airport showing the movement of aircraft, in accordance with various aspects described herein.

FIG. 4 illustrates a map of an airport 58 for showing a method of moving and starting an aircraft 60. Referring to FIGS. 3 and 4, the method can comprise engaging the nose wheel 62 of the aircraft 60 at an airport terminal 50 with the coupler 64 or lift mechanism 66 of the taxi vehicle 10. The method can further include connecting electrical power 24 from the fuel cell 22 to the aircraft 60 and a pneumatic supply (air) 78 from the taxi vehicle 10 to the aircraft 60 while engaging the nose wheel 62. The method can further include driving the taxi vehicle 10 along taxiway 54 outbound to a pre-flight holding area 52a near runway 56, starting engines of the aircraft 60 using the electrical power 24 and the pneumatic supply 78 of the taxi vehicle 10, and disengaging the nose wheel 62 of the aircraft 60 from the coupler 64 while disconnecting the electrical power 24 and the pneumatic supply 78 from the aircraft 60 after the aircraft is started. The actions of disengaging the nose wheel and disconnecting the electrical power can be configured to be simultaneous.

Alternately, the taxi vehicle can be used to move an aircraft 60 inbound from a post-flight holding area 52b near the runway 56 to an aircraft terminal 50 by engaging the nose wheel 62 of the aircraft 60 with the coupler 64 of the taxi vehicle 10 and automatically connecting electrical power 24 and pneumatic supply 78 to the aircraft 60. The method can further include driving the taxi vehicle 10 to the aircraft terminal 50 and attaching a ground power supply 51 to the aircraft 60. The ground power supply 51 can be DC and AC power cables located at a parking area for the aircraft near the airport terminal where passengers board and deplane. The method can further include disengaging the nose wheel 62 of the aircraft 60 from the coupler 64 and disconnecting the electrical power 24 and the pneumatic supply 78 from the aircraft 60. The actions of disengaging the nose wheel and disconnecting the electrical power can be configured to be simultaneous.

In various aspects of the disclosure, taxi vehicles can operate indefinitely, except for refueling, while taxiing between runway holding areas 52a-b and airport terminals 50. The pre-flight area 52a can include a queue of multiple aircraft waiting to take off and performing pre-flight checks. Once the aircraft engines have started, aircraft movement is self-powered via engine thrust.

Figure 5:
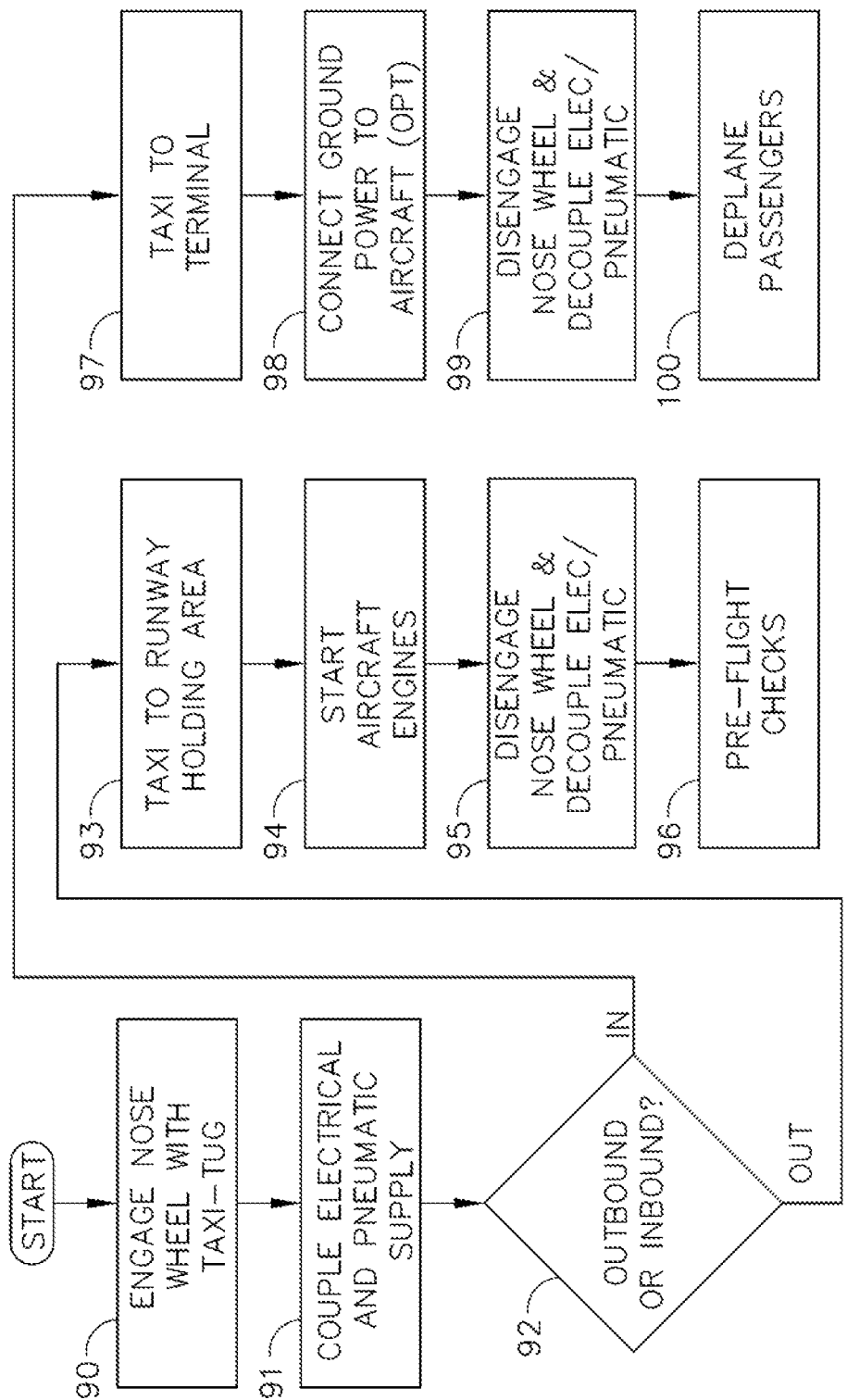
FIG. 5 is a flow diagram illustrating a method of moving and starting an aircraft, in accordance with various aspects described herein.

Referring to FIG. 5, a logic flow of the method of FIG. 4 is described wherein the nose wheel can be engaged 90 and electrical and pneumatic supplies can be connected 91 to the aircraft. If the movement 92 is outbound, the taxi vehicle can drive 93 the aircraft to a pre-flight holding area, whereupon the engines can be started 94 and the nose wheel disengaged 95 and power inputs disconnected, followed by pre-flight checks 96. If the movement 92 of the aircraft is inbound, the taxi vehicle can drive 97 the aircraft to the airport terminal, ground power can be connected 98 to the aircraft, whereupon the nose wheel can be disengaged 99 and power inputs disconnected, followed by deboarding 100 any passengers, crew, and/or baggage.

Alternatively, once the taxi vehicle 10 has moved the aircraft 60 to the starting point or pre-flight holding area 52a, the nose wheel 62 can be disengaged from the taxi vehicle and the aircraft 60 powered by a ground power system (not shown) at 52a before the engine(s) of the aircraft or the APU are started. For example, there may be a long queue of aircraft waiting to take off and a need for the taxi vehicle to return to an airport terminal, and the crew may not be ready to start the engines, in which case it could be a better use of available resources to disengage the nose wheel before starting the APU and engines.

Many other possible embodiments and configurations in addition to that shown in the above figures are contemplated by the present disclosure. To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" or "a plurality of" various elements have been described, it will be understood that "a set" or "a plurality" can include any number of the respective elements, including only one element. Combinations or permutations of features described herein are covered by this disclosure.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A taxi vehicle for moving a craft, the taxi vehicle comprising:
   a chassis having a coupler to connect to a coupling location of the craft;
   a set of wheels to move the chassis;
   a hybrid fuel cell engine including a fuel cell and a gas turbine engine;
   at least one electric motor coupled to the set of wheels;
   the fuel cell in the chassis coupled to the at least one electric motor to energize the at least one electric motor; and
   a battery coupled to the fuel cell and to the at least one electric motor, wherein the battery is configured to supply peak power demand to the at least one electric motor to start moving the craft or to start the fuel cell, and to receive charge from the fuel cell when not supplying peak power demand while the fuel cell supplies power to the at least one electric motor to continue moving the craft.

2. The taxi vehicle of claim 1, wherein the fuel cell is one of a solid oxide fuel cell or a molten carbonate fuel cell.

3. The taxi vehicle of claim 1, wherein the craft is an aircraft and the coupling location is a nose wheel of the aircraft.

4. The taxi vehicle of claim 3, further comprising a power connector to provide electrical power from the fuel cell to the aircraft.

5. The taxi vehicle of claim 4, wherein the gas turbine engine provides a pneumatic power deliverable to the aircraft through the power connector.

6. The taxi vehicle of claim 3, wherein the coupler is a lift mechanism to engage and lift the nose wheel.

7. The taxi vehicle of claim 6, wherein the chassis comprises a hydraulic pump powered by the fuel cell and the lift mechanism includes a hydraulic supply connected to the hydraulic pump.

8. The taxi vehicle of claim 1, further comprising a power connector to provide electrical power from the fuel cell to the craft.

9. The taxi vehicle of claim 8, wherein the gas turbine engine provides a pneumatic power deliverable to the aircraft through the power connector.

10. The taxi vehicle of claim 8, wherein the coupler is a lift mechanism and the power connector is part of the lift mechanism to connect electrical power to the craft as the lift mechanism engages and lifts the craft at the coupling location.

11. A method of moving and starting a craft using a taxi vehicle, wherein the taxi vehicle comprises:
    a chassis having a coupler to connect to a coupling location of the craft;
    a set of wheels to move the chassis;
    at least one electric motor coupled to the set of wheels;
    a hybrid fuel cell engine including a fuel cell and a gas turbine engine;
    the fuel cell in the chassis coupled to the at least one electric motor to energize the at least one electric motor; and
    a battery coupled to the fuel cell and to the at least one electric motor, wherein the battery is configured to supply peak power demand to the at least one electric motor to start moving the craft or to start the fuel cell, and to receive charge from the fuel cell when not supplying peak power demand while the fuel cell supplies power to the at least one electric motor to continue moving the craft;
    the method comprising:
        engaging a coupling location of the craft with a coupler of a taxi vehicle powered by a fuel cell and a battery coupled to at least one electric motor to move the taxi vehicle;
        connecting electrical power from the fuel cell to the craft and a pneumatic supply from the taxi vehicle to the craft while engaging the coupling location;
        driving the taxi vehicle to a starting point for the craft; and
        starting the craft using the electrical power and the pneumatic supply from the taxi vehicle.

12. The method of claim 11, further comprising disengaging the coupling location from the coupler and disconnecting the electrical power and the pneumatic supply from the craft after the craft is started.

13. The method of claim 11, wherein the craft is an aircraft and the coupling location is a nose wheel of the aircraft.

14. The method of claim 13, wherein the coupler is a lift mechanism to engage and lift the nose wheel.

15. The method of claim 11, wherein the starting point is a holding area near a runway remote from an airport terminal.

16. The method of claim 11, further comprising automatically coupling hydraulic power from the taxi vehicle to the craft while engaging the coupling location.

17. The method of claim 11, further comprising driving the taxi vehicle by remote control from a location inside the craft.

18. A method of moving an aircraft using a taxi vehicle wherein the taxi vehicle comprises:
    a chassis having a coupler to connect to a coupling location of the craft;
    a set of wheels to move the chassis;
    at least one electric motor coupled to the set of wheels;
    a hybrid fuel cell engine including a fuel cell and a gas turbine engine;
    the fuel cell in the chassis coupled to the at least one electric motor to energize the at least one electric motor; and
    a battery coupled to the fuel cell and to the at least one electric motor, wherein the battery is configured to supply peak power demand to the at least one electric motor to start moving the craft or to start the fuel cell, and to receive charge from the fuel cell when not supplying peak power demand while the fuel cell supplies power to the at least one electric motor to continue moving the craft;
    the method comprising:
        engaging a nose wheel of the aircraft with a coupler of a taxi vehicle powered by a fuel cell and a battery coupled to at least one electric motor to move the taxi vehicle from a first location;
        connecting electrical power from the fuel cell to the aircraft and a pneumatic supply from the taxi vehicle to the aircraft while engaging the nose wheel;

driving the taxi vehicle to a second location; attaching a ground power supply to the aircraft; and disengaging the nose wheel of the aircraft from the coupler, and disconnecting the electrical power and the pneumatic supply from the aircraft after the ground power supply is attached.

19. The method of claim 18, wherein the coupler is a lift mechanism to engage and lift the nose wheel.

\* \* \* \* \*